J. T. OSLER.
CLUTCH MECHANISM FOR SHEARING MACHINES AND THE LIKE.
APPLICATION FILED OCT. 16, 1912.

1,060,850.

Patented May 6, 1913.
5 SHEETS—SHEET 1.

WITNESSES

INVENTOR

J. T. OSLER.
CLUTCH MECHANISM FOR SHEARING MACHINES AND THE LIKE.
APPLICATION FILED OCT. 16, 1912.

1,060,850.

Patented May 6, 1913.

5 SHEETS—SHEET 3.

WITNESSES

INVENTOR

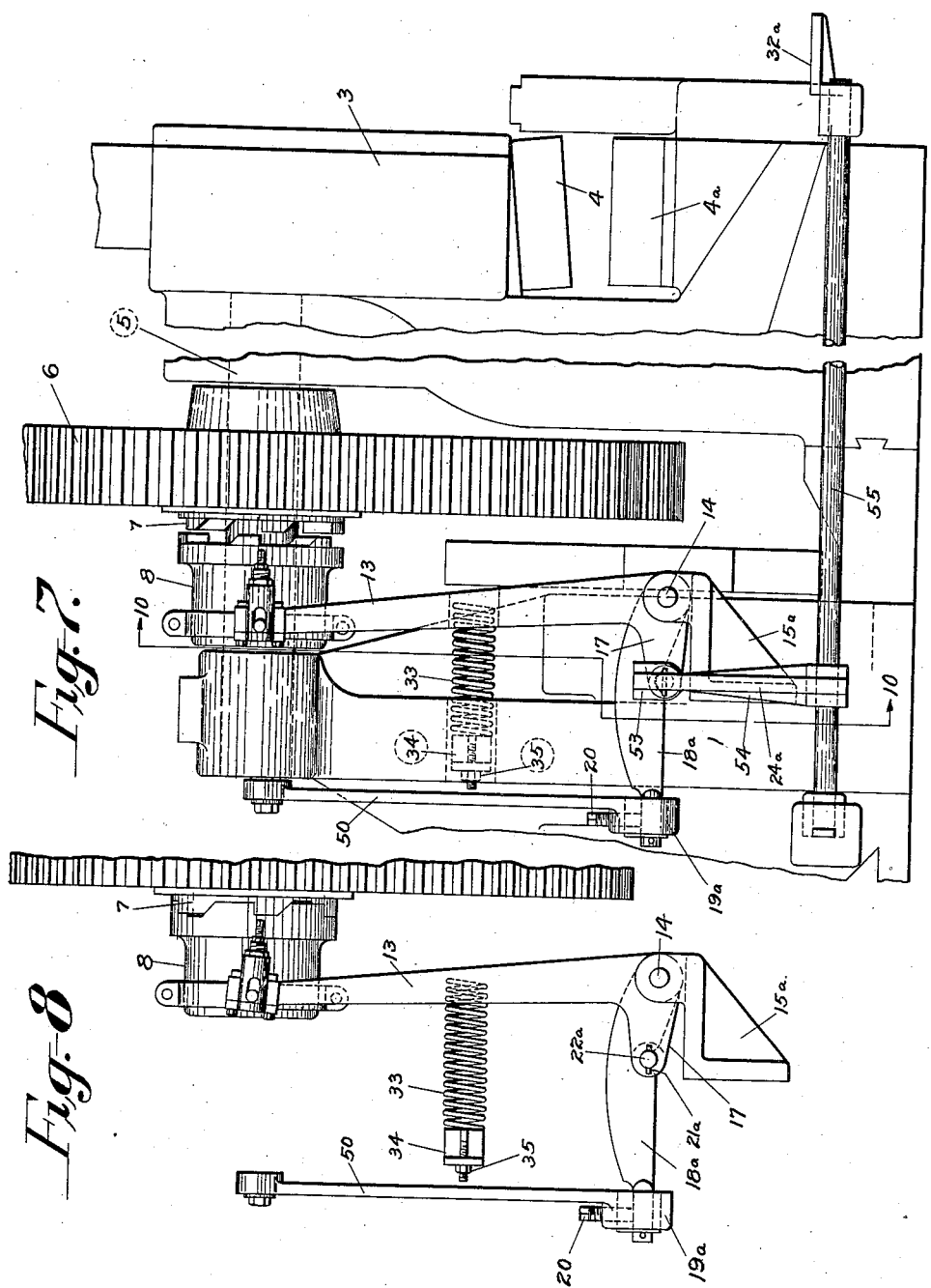

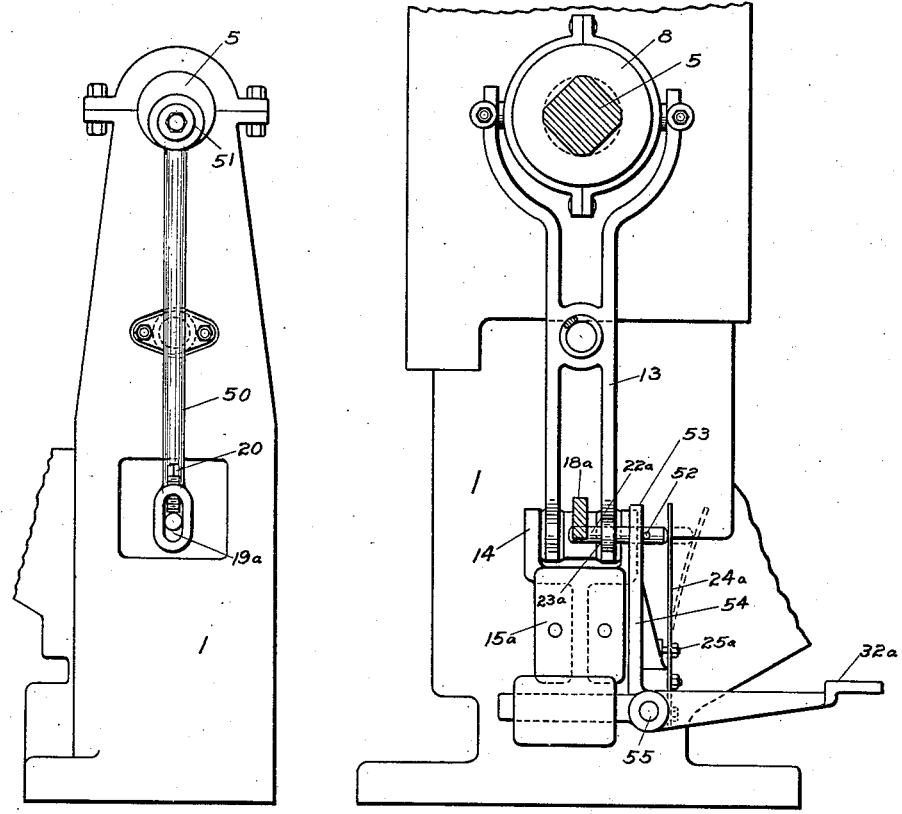

UNITED STATES PATENT OFFICE.

JAY T. OSLER, OF CORAOPOLIS, PENNSYLVANIA, ASSIGNOR TO LEWIS FOUNDRY AND MACHINE COMPANY, OF PITTSBURGH, PENNSYLVANIA, A CORPORATION OF PENNSYLVANIA.

CLUTCH MECHANISM FOR SHEARING-MACHINES AND THE LIKE.

1,060,850.      Specification of Letters Patent.      Patented May 6, 1913.

Application filed October 16, 1912. Serial No. 726,167.

*To all whom it may concern:*

Be it known that I, JAY T. OSLER, a resident of Coraopolis, in the county of Allegheny and State of Pennsylvania, have invented a new and useful Improvement in Clutch Mechanism for Shearing-Machines and the Like, of which the following is a specification.

This invention relates to clutches for shearing machines, die-presses, punching machines and the like.

The object of the invention is to provide new and improved clutch mechanism embodying a trip device controlled by the movable head, or by a part moving in timed relation therewith, for throwing out the operating or controlling clutch, said trip device being so arranged that it can be manipulated to cause the movable head to make one or more complete strokes, after which the controlling clutch is automatically disconnected.

A further object of the invention is to provide improved clutch operating mechanism wherein the clutch members are normally held in engagement with each other by yieldable means and are disconnected positively, means being also provided in connection with the clutch operating member for definitely separating the clutch members from each other, when disconnected, to provide clearance therebetween, said means being adjustable to vary the amount of such clearance.

A further object of the invention is to provide new and improved clutch operating mechanism, controlled by the movable head, or by a part moving in timed relation therewith, and embodying yielding means between the head or operating member and the movable clutch member to prevent shock and damage when the clutch mechanism is operated.

Further objects of the invention are in part obvious and in part will appear more in detail hereinafter.

Figure 1:
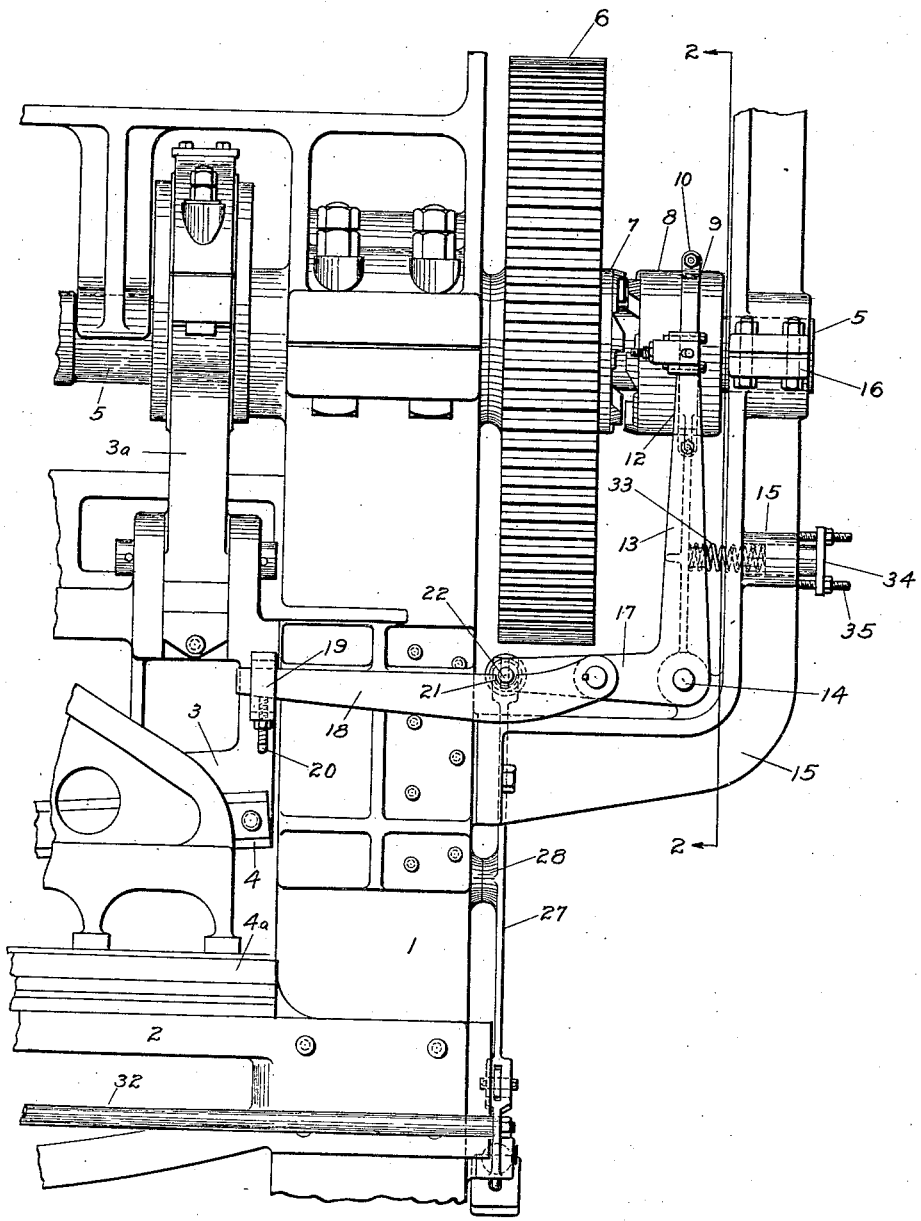
Figure 2:
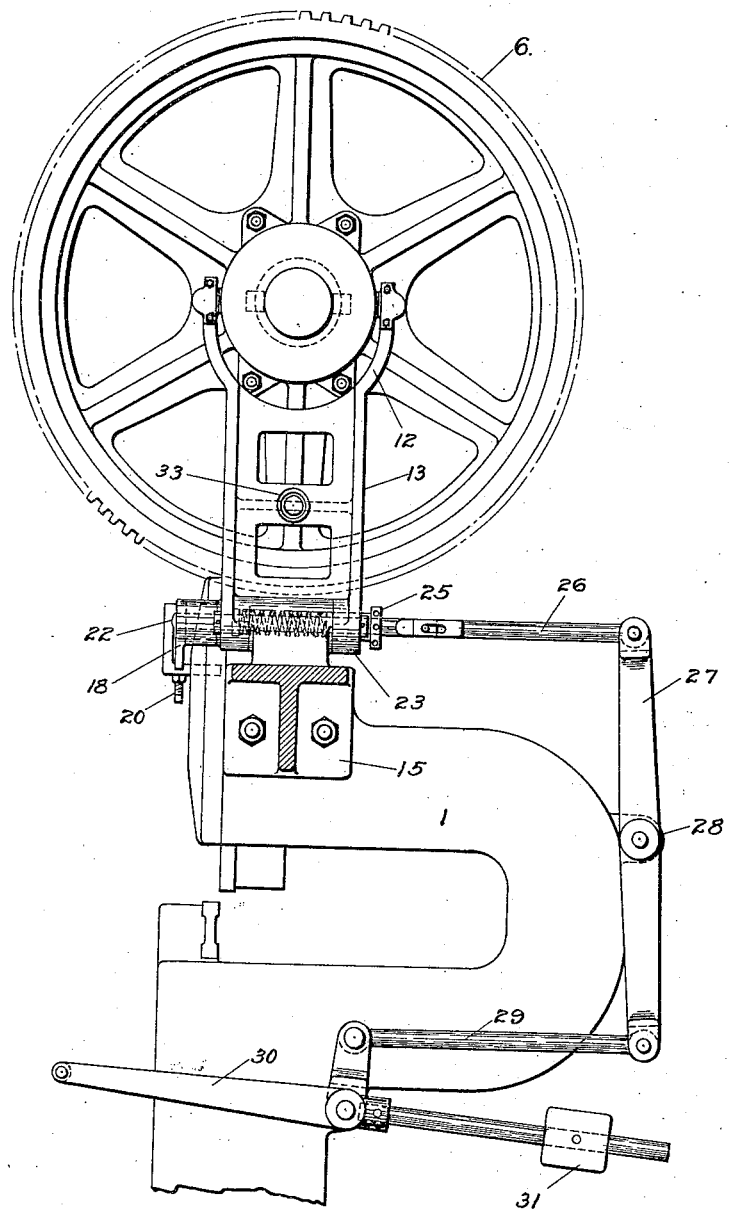
Figure 5:
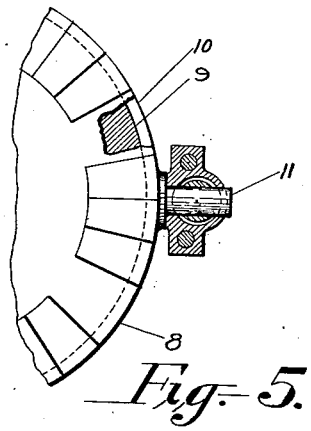
Figure 4:
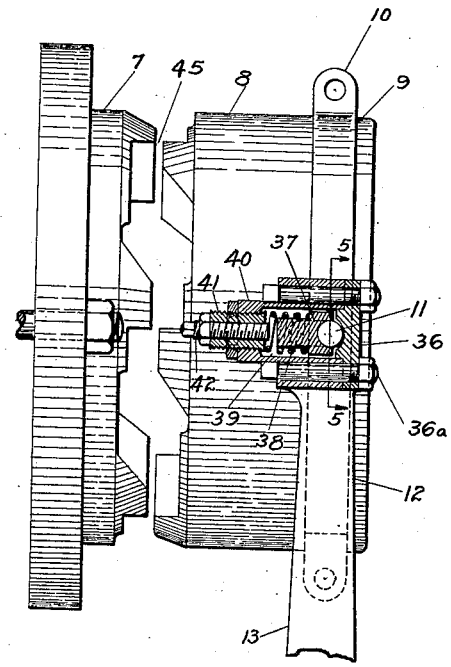
Figure 6:
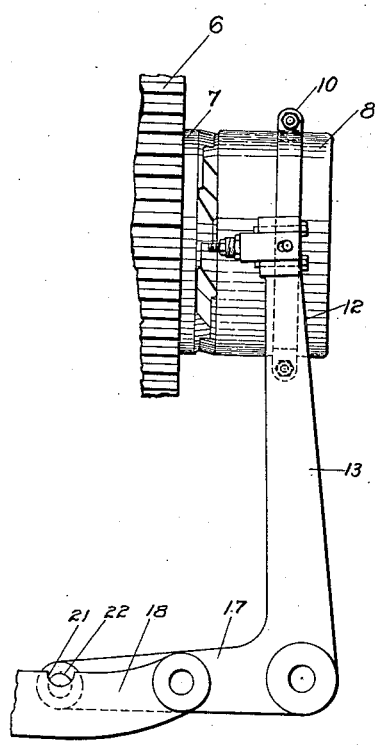
Figure 3:
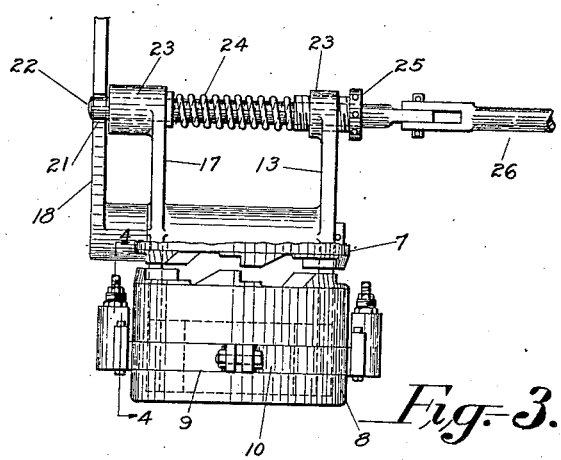

In the drawings Figure 1 represents a front elevation of a portion of a shearing machine, with my invention applied thereto; Fig. 2 is a sectional elevation thereof, on the line 2—2, Fig. 1, the outboard bearing being removed; Fig. 3 is a detail plan view showing the operating pin and its controlling member; Fig. 4 is an enlarged elevation, partly in section on the line 4—4, Fig. 3, and showing in detail the connection between the movable clutch member and the operating lever; Fig. 5 is a detail section on the line 5—5, Fig. 4; Fig. 6 is a detail view showing the clutch members engaged; Fig. 7 is a front elevation of a different form of machine, and showing a modified form of my invention applied thereto, the clutch members being disengaged; Fig. 8 is a detail view showing the clutch members engaged; Fig. 9 is a detail side elevation of the machine shown in Fig. 7; and Fig. 10 is a sectional elevation on the line 10—10, Fig. 7.

The machine shown in Figs. 1 to 6 of the drawings comprises a frame or housing 1 provided with a base or table 2 and a movable head 3. The movable head 3 may carry a punch or shaping member to coöperate with companion members on the base, and is illustrated as carrying a shear 4 to coöperate with a suitable stationary shear 4ᵃ on the base or table. The movable head 3 is reciprocated in the frame or housing by any suitable connections 3ᵃ to an operating shaft 5 which rotates in the frame or housing and is provided with a loosely running gear 6 thereon, said gear being suitably driven in any manner by power mechanism. Gear 6 is provided with a clutch member 7 having clutch teeth thereon to coöperate with the teeth of a movable clutch member 8 splined or otherwise connected to rotate with shaft 5. The clutch member 8 is provided with an annular groove 9 to receive a split ring or collar 10 having trunnions 11 thereon connected to the arms of clutch fork 12 which fork comprises a double lever 13 pivoted at 14 in a bracket 15 supporting outboard bearing 16 for shaft 5. One of the horizontal parallel arms 17 of lever 13 has pivotally secured thereto, intermediate its ends, a trip lever 18 whose free end is engaged by a yoke 19 on the movable head 3. Preferably, an adjustable stop screw 20 is secured in yoke 19 to contact the lower side of lever 18 for a purpose to be described. Intermediate its ends lever 18 is provided with a depression 21 adapted to be engaged by the end of a stop pin 22 which is slidable in bearings 23 in the ends of the parallel horizontal arms 17 of lever 13 and is normally advanced in the path of movement of lever 18 by a compression spring 24 between said arms, the tension of which may be adjusted by a plug or threaded member 25. Stop pin 22 may be retracted or withdrawn from the path of movement of lever 18 by connecting rod 26, lever 27 which is fulcrumed at 28 upon the frame or housing, connecting rod 29 and treadle lever 30, the latter being provided with a weight or counterbalance 31 and controlled by a foot bar or rod 32 extending across the front of the machine.

The movable member 8 of the clutch is normally moved into engagement with the other member thereof by a suitable spring 33 interposed between lever 13 and a member 34 in the bracket 15, which member is adjustable by bolts and nuts 35 to vary the tension of spring 33. The clutch members are therefore always yieldingly moved into engagement and injury which might occur under the shock of coupling is to a large extent avoided. Yielding connection is also provided between the clutch operating lever 13 and the clutch so as to prevent shock and hammering when the trip mechanism is operated to open the clutch. As illustrated, the trunnions 11 engage bearing members on the two vertical members of fork 12, each said bearing being formed in two parts, one part 36 thereof being rigidly secured to the fork by bolts 36ª and the other part 37 being movable therein and pressed into engagement with the trunnion by a spring 38. Said springs are each seated in the bore 39 of a box or sleeve 40 on the fork and may have their tension adjusted or regulated by a plug or sleeve 41 threaded into the end of said box or sleeve. A set screw 42 is threaded through the sleeve or plug 41 and serves as a stop or abutment for the movable bearing member 37 in opening or disconnecting the clutch. This set screw also determines the amount of clearance between the teeth on the two clutch members when opened or disconnected.

When the movable head 3 of the machine is idle it is usually maintained in its uppermost position and the clutch is then disengaged. To start the machine treadle 30 is depressed to thereby withdraw pin 22 from the depression 21 in lever 18, thereby permitting spring 33 to oscillate lever 13 about its fulcrum 14 and yieldingly move the clutch member 8 into engagement with the clutch on gear 6 and dropping pin 22 below the depression 21 to the position indicated in Fig. 6. Operating gear 6 is therefore connected to shaft 5 and the head 3 begins to move downwardly, the yoke 19 thereon swinging lever 18 around its fulcrum on lever 17. When lever 18 moves beyond the depressed position of pin 12 said pin is immediately advanced under the influence of its spring 24 into the path of return movement of lever 18, assuming, of course, that the foot has been withdrawn from treadle 30 and that it is desired to disconnect the head from its operating mechanism at the end of the stroke. The main shaft makes a complete revolution and after the head has been fully depressed it rises and thus swings lever 18 upwardly around its pivot. When lever 18 is raised sufficiently the depression 21 contacts with pin 22 and lever 18 becomes in effect a rigid extension of the arm 17 of lever 13 so that further upward movement of the head 3 rocks lever 13 on its fulcrum 14 to disconnect the clutch members. The clutches themselves being in engagement and rotating under the influence of the driving mechanism offer considerable frictional resistance to disengagement which causes the fixed bearing members 36 on yoke 12 to move in advance of or away from trunnions 11, the movable bearing members 37 being retarded with trunnions 11 and compressing springs 38. When the yoke 12 is moved sufficiently set screws 42 contact the end of the movable bearing members 37 and any further movement of lever 13 positively moves the trunnions 11 and the clutch member 8, which is therefore positively pulled outwardly until entirely disengaged from the clutch member 7 on gear 5. As soon as the clutch members are wholly disengaged the friction therebetween no longer obtains and movable clutch member 8 is then immediately further separated from clutch member 7 by springs 38, which are still under tension and expand to move bearing members 37 away from the stop screws 42. This provides a definite clearance, indicated at 45, Fig. 4, between the teeth on the clutch members, and this clearance space is always equal to the distance between bearing 37 and set screw 42. Adjustment of set screws 42 therefore controls the amount of clearance between the clutch members.

Springs 38 serve for two distinct purposes. In the first place, they form a yielding connection between the clutch operating lever or fork and the movable clutch member and thereby prevent shock and injury to the parts on disconnecting the clutch or when the adjustable stop screw 20 engages the lever 19. Secondly, they have the distinct function of definitely separating the clutch members after they are wholly disengaged to thereby provide the necessary clearance to prevent the clutch members from wiping over each other and chattering. Screw 20 may be adjusted to take up any wear in the parts or bending of the lever mechanism and also to insure complete disengagement of the clutch members at exactly the proper point desired by the operator.

It will of course be understood that in case it is desired that the movable head be given several complete reciprocations, the operating treadle 30 is held down to maintain the pin 22 withdrawn from the path of movement of trip lever 18. Under such circumstances the clutch remains connected and the head is reciprocated and oscillates the lever 18 idly about its fulcrum. Whenever it is desired to stop the machine the treadle 30 is released, when the spring 24 immediately projects the pin into engagement with lever 18, when the clutch is disconnected and the machine stops with the head in elevated position as described.

The mechanism may be applied to any machine embodying a reciprocating head to which it is desired to give one or more reciprocations and it is to be understood that the invention is not limited to the particular design of machine shown in the drawings.

Figs. 7 to 10 inclusive illustrate a different form of shearing machine with a modified form of the invention applied thereto. The machine shown comprises a frame or housing 1 carrying a fixed or stationary shear member 4$^a$. The movable head 3 carrying the movable shear 4 is operated by a driving shaft 5 on which is loosely rotatable the driving gear 6 having a clutch member 7 secured thereto. The companion clutch member 8 is movable on the shaft and is controlled by a lever 13. It will be understood that the connection between the lever 13 and movable clutch member 8 is exactly the same in all of its details as that between the clutch operating lever 13 and movable clutch member 8 in the form of machine shown in Figs. 1 to 6. Clutch operating lever 13 comprises a pair of parallel members, as in the other form, said members being pivoted at 14 on a bracket 15$^a$ secured to the frame or housing 1. The clutch operating lever 13 is normally moved to engage the movable member 8 of the clutch with the fixed member 7 thereof, by a suitable spring 33 interposed between the lever and a member 34 located in a socket in a portion of the fixed housing 1, said member 34 being adjustable by bolts and nuts 35 as before, to vary the tension of the spring. Lever 13 is moved in the other direction, to disengage the clutch, by a trip lever 18$^a$ pivoted at one end upon the same trunnion 14 which supports the lever 13, and the outer free end of which is engaged in a yoke 19$^a$ on the end of a link or connecting rod 50 operated by an eccentric 51 on the end of the main operating shaft 5. Yoke 19$^a$ carries an adjustable abutment or stop screw 20 which contacts with trip lever 18$^a$ and may be adjusted to vary the relation between the trip lever and the eccentric 51. In this case the short horizontal arms 17 of lever 13 are on the opposite side of the pivot 14 from the clutch member 8 and consequently the arms 17 must be swung downwardly to disengage the clutch members, instead of being swung upwardly, as in Fig. 1. Trip lever 18$^a$ is provided intermediate its ends and on its under side with a depression 21$^a$ adapted to be engaged by the end of a stop pin 22$^a$ which is slidable in a bearing 23$^a$ in the outer end of one of the arms 17 of the lever 13. Said stop pin is normally advanced into path of movement of trip lever 18$^a$ by a leaf spring 24$^a$, which is secured to the stationary arm or housing and engages the outer end of the stop pin. The tension of this spring may be adjusted or varied by a suitable screw or bolt 25$^a$ threaded into the housng. The outer end of the stop pin 22$^a$ is provided with a pin or collar 52 engaged by a slotted yoke 53 on the upper end of a bell crank lever 54 secured to a shaft or rod 55 and provided at one end with a foot treadle 32$^a$. The operation of this mechanism is substantially the same as that before described. Normally, or when the machine is not running, the parts occupy the positions shown in Figs. 7, 9 and 10, the eccentric 51 being at the lowest point in its movement around the center of shaft 5. When it is desired to start the machine treadle 32$^a$ is depressed and the lever 54 moves the stop pin 22$^a$ outwardly to disengage its inner end from the depression 21$^a$ in the trip lever 18$^a$. This permits spring 33 to swing the clutch operating lever 13 on its pivot 14 to the position shown in Fig. 8 and engage the clutch members. During this movement the pin 22$^a$ travels along the side of the trip lever 18$^a$. If it is desired that the machine shall complete a single cycle of steps the foot is now withdrawn from the treadle 32$^a$ and the spring 24$^a$ then exerts force tending to move the stop pin 22$^a$ into normal position. The machine starts running and the eccentric 51 is carried around the axis of shaft 5, thereby lifting the outer end of trip lever 18$^a$. When the trip lever moves sufficiently far stop pin 22$^a$ is forced forwardly by the spring 24$^a$, and when the link or connecting rod 50 begins to move downwardly trip lever 18$^a$ becomes in effect an extension of the short horizontal arms 17 of lever 13. Consequently this lever is swung about the pivot 14 and thereby disconnects the clutch members. As before stated, the connection between lever 13 and clutch member 8 is exactly the same in all of its details as that described in connection with the machine shown in Fig. 1. Lever 13 first swings outwardly without moving the clutch member and later the clutch member 8 is suddenly thrown fully out of engagement with the clutch member 7 and definitely separated therefrom to provide clearance between the clutch members. The cycle of operations then ceases with the parts in their initial positions, as illustrated in Figs. 7, 9 and 10. It of course should be understood that the machine may be given a plurality of succeeding or continuous cycles of operations by merely holding down the foot treadle 32ᵃ.

What I claim is:—

1. In a construction of the character described, the combination of a movable head, driving mechanism therefor, mechanism for controlling the operating connections between said head and its driving means comprising clutch members, a lever operated in timed relation with said head and connected to said clutch for disconnecting the same, yielding means between said lever and clutch and arranged to permit movement of the lever relative to the clutch before movement of the clutch, and adjustable means for varying the amount of relative movement between the lever and clutch.

2. In a construction of the character described, the combination of a movable head, driving mechanism therefor, mechanism for controlling the operating connections between said head and its driving means comprising clutch members, a lever operatively connected to said driving mechanism, a movable yielding member carried by said lever and connected to said clutch for disconnecting the same, and means on said lever for adjusting the amount of movement of said member to thereby vary the clearance between said clutch members when disconnected.

3. In a construction of the character described, the combination of a movable head, driving means therefor, a clutch controlling the operating connection between said head and its driving means, a lever having means for moving the same to operate said clutch, a trip lever, and movable means for operatively connecting said levers and arranged when moved in one direction to disconnect the same to thereby permit movement of the clutch operating lever to connect said clutch.

4. In a construction of the character described, the combination of a movable head, driving means therefor, a clutch controlling the operating connection between said head and its driving means, a lever having means for moving the same to operate said clutch, a trip lever, movable means for operatively connecting said levers and arranged when moved in one direction to disconnect the same to thereby permit movement of the clutch operating lever to connect said clutch, means for moving said movable means, and a spring for moving said movable means in the opposite direction to thereby operatively connect said levers.

5. In a construction of the character described, the combination of a movable head, driving means therefor, a clutch controlling the operating connection between said head and its driving means, a lever arranged to operate said clutch, a spring for moving the same, in one direction, a trip lever controlled by said head, and movable means for operatively connecting said levers and arranged when moved in one direction to disconnect the same and permit said lever operating means to connect said clutch.

6. In a construction of the character described, the combination of a movable head, driving means therefor, a clutch controlling the operating connection between said head and its driving means, a lever connected to said clutch for operating the same, a swinging trip lever operated in timed relation with said head, and movable means arranged when moved to operatively connect or disconnect said levers.

7. In a construction of the character described, the combination of a movable head, driving means therefor, a clutch controlling the operating connection between said head and its driving means, a lever operatively connected to said clutch, a trip lever operated in timed relation with said head, and means on said clutch operating lever arranged to engage said trip lever intermediate its ends to thereby permit movement of said clutch operating lever by said driving means to disconnect said clutch.

8. In a construction of the character described, the combination of a movable head, driving means therefor, a clutch controlling the operating connection between said head and its driving means, a lever operatively connected to said clutch, a swinging trip lever operated in timed relation with said head, means on said clutch operating lever arranged to engage said trip lever intermediate its ends to thereby permit movement of said clutch operating lever by said driving means to disconnect said clutch, and a spring connected to said clutch operating lever for normally coupling said clutch.

9. In a construction of the character described, the combination of a movable head, driving means therefor, a clutch controlling the operating connection between said head and its driving means, a lever operatively connected to said clutch, a swinging trip lever operated in timed relation with said head, means on said clutch lever arranged to engage said trip lever intermediate its ends to thereby permit movement of said clutch operating lever by said driving means, and means arranged to disengage said means from said trip lever to thereby permit said clutch operating lever to connect said clutch.

10. In a construction of the character described, the combination of a movable head, driving means therefor, a clutch controlling the operating connection between said head and its driving means, a lever operatively connected to said clutch, a spring connected to said clutch operating lever and arranged to normally move the same to connect said clutch, a trip lever pivoted at one end and at its other end operatively connected to said head, and means on said clutch operating lever arranged to engage said trip lever intermediate its ends, said means being disengageable from said trip lever to thereby permit said spring to connect said clutch.

11. In a construction of the character described, the combination of a movable head, driving means therefor, a clutch controlling the operating connection between said head and its driving means, a lever operatively connected to said clutch, a swinging trip lever operated in timed relation with said head, a pin movable in said clutch operating lever and arranged to engage said trip lever to thereby connect said levers to operate said clutch, and a treadle connected to said pin for disengaging the same from said trip lever.

12. In a construction of the character described, the combination of a movable head, driving means therefor, a clutch controlling the operating connection between said head and its driving means, a lever operatively connected to said clutch, a swinging trip lever operated in timed relation with said head, a pin movable in said clutch operating lever and arranged to engage said trip lever to thereby connect said levers to operate said clutch, a treadle connected to said pin for disengaging the same from said trip lever, and a spring for normally projecting said pin into engagement with said trip lever.

In testimony whereof, I have hereunto set my hand.

JAY T. OSLER.

Witnesses:
L. C. STEELE,
ELBERT L. HYDE.